Patented Sept. 5, 1933

1,925,560

UNITED STATES PATENT OFFICE 1,925,560

VITREOUS ENAMEL COMPOSITION AND METHODS OF MAKING SAME

Charles J. Kinzie and John A. Plunkett, Niagara Falls, N. Y., assignors to The Titanium Alloy Manufacturing Company, New York, N. Y., a corporation of Maine No Drawing. Application March 11, 1930
Serial No. 435,018

8 Claims. (Cl. 23—51)

Our invention relates more particularly to improved methods for the production of acid resisting enamels, and especially for forming titanium compounds for adding to the raw batch of enameling materials when making enamel frits or glasses for use in the production of acid resisting vitreous enamel coating on metal.

The objects of our invention are, among other things, to produce a novel vitreous enamel composition in the form of a sodium titanium silicate either in amorphous or crystalline form derived from the ingredients compounded by fusing to a glass or by dry roasting, which composition enables the titanium to be introduced into the enamel with advantages during smelting and also introduces at the same time a large part of the silica required for such enamels in a precombined form.

Our invention consists in this new vitreous enamel composition hereinafter described according to the preferred embodiments and also in the novel methods of compounding or making same.

In our experiments in connection with the use of titanium oxide in producing acid resisting enamels, we observed that when the batch containing the titanium oxide along with the other ingredients was mixed by the usual mixing procedures and smelted, numerous blue specks or clots would persist.

In large scale smelting operations it was necessary to continue the heating of the molten enamel for relatively long periods so that these blue clots (which consisted of titanium oxide) should be completely dissolved. In order to use the titanium oxide, we finally found it advisable to subject the raw mix containing such titanium oxide to a mixing and disintegrating operation which thoroughly blended the titanium oxide aggregates with the remainder of batch, and so the presence of these persisting titanium clots was for all practical purposes overcome.

Having overcome this difficulty with the titanium oxide, we discovered that there persisted in the melt for too long periods small particles of silica (quartz). To overcome this added difficulty we endeavored to produce a titanium product which would not only blend into the raw mix by the usual mixing practices, but also produce a silica combination with the titanium that would be more readily dissolved in the melting operation.

Enamel batches containing titanium oxide tend to be quite bulky due to the fluffy nature of the usual titanium oxide products available. Since the capacity of a smelting furnace is largely a question as to how much raw mix it will hold, if the titanium could be reduced in bulk or volume, a point in good practice would be gained since the capacity of smelter would be increased thereby.

After considerable experimental work we succeeded in producing a titanium compound which would be relatively dense, and which would be so composed as not to produce the troublesome persisting blue clots referred to when the batch was mixed accordingly to usual enameling practices.

As a result of this work we have discovered methods for the production of novel sodium titanium silicates which, when introduced into the raw batch and mixed in the usual manner, not only served to introduce the titanium without troublesome smelting effects, but also at same time introduced a large part of the silica in a precombined form. This resulted in more rapid smelting of the raw batch of enameling materials.

In order that our invention may be clearly understood and readily carried into effect, we will now set forth two examples to show specifically the new vitreous enamel composition and methods of making same for particular use in producing acid resisting enamels, such examples being merely illustrative and in no wise limiting the scope of our invention.

*Example A.*—Sodium titanium silicates by dry roasting

We found that certain mixtures of soda ash ($Na_2CO_3$) titanium oxide ($TiO_2$) and milled quartz, flint, etc. (—140 mesh), when mixed and intimately blended together, would react at relatively low temperatures and yield products which were not fused, being easily crushed, and in which the reactions had proceeded to the point of essentially complete combinations of the soda, titanium and silica.

In such products too great an amount of silica should be avoided since even at the low temperatures used, glasses would form and product would sinter or frit together. In order to avoid this result where a higher silica content was used, it was necessary to lower the temperature and so undesirably slow down the reaction.

The following description shows the preferred charge and procedure for producing a sodium titanium silicate at relatively low temperatures in form of a non-fritted material.

A charge consisting of

| | Parts by weight |
|---|---|
| Soda ash ($Na_2CO_3$) | 106 |
| Titanium oxide ($TiO_2$) | 80 |
| Silica ($SiO_2$) | 60 |
| | 246 | is intimately mixed, preferably in a disintegrating machine, to effect a very intimate contact between all three ingredients.

This charge is then heated in any suitable manner to a temperature which need not be higher than 850° C., and it can be considerably lower if sufficient time is allowed. We prefer to use the highest possible temperature while at same time maintaining a dry, non-fritted charge so that the reaction may be effected on the hearth of a semi-muffle furnace or in a rotary furnace.

When the reaction has reached a point where no carbon dioxide is evolved and practically all the constituents have combined, the product is withdrawn from the furnace, cooled and disintegrated to suitable size for use.

The product produced will correspond to the formulæ ($Na_2TiSiO_5$) and will have the following composition:

| | Per cent |
|---|---|
| Sodium oxide ($Na_2O$) | 30.69 |
| Titanic oxide ($TiO_2$) | 39.60 |
| Silica ($SiO_2$) | 29.71 |
| | 100.00 |

This product when used to introduce titanium in enamel glasses, that is incorporating it into the raw mix, has none of the disadvantages of titanium oxide. Since the product is fusible at enamel smelting temperatures, it serves as a flux and results in a quicker smelting of the charge and also tends to assist in obtaining the uniformly complete combinations of all materials of the charge.

*Example B.—Sodium titanium silicates by fusion*

A charge consisting of

| | Parts by weight |
|---|---|
| Soda ash ($Na_2CO_3$) | 106 |
| Titanium oxide ($TiO_2$) | 80 |
| Silica ($SiO_2$) | 240 |
| | 426 | is mixed and charged into a smelting furnace and heated to about 1190° C. The materials react and melt to a clear glass which is poured or discharged from furnace into water thereby shattering the glass so as to facilitate the later grinding operations.

The compound produced from charge given yields a glass having the following composition corresponding with the formulæ ($Na_2TiSi_4O_{11}$):

| | Per cent |
|---|---|
| Sodium oxide ($Na_2O$) | 16.23 |
| Titanium oxide ($TiO_2$) | 20.94 |
| Silica ($SiO_2$) | 62.83 |
| | 100.00 |

The glass is then dried and dry ground to suitable size which need not be very fine. The grinding is not essential as the quenched glass can readily be used in compounding the raw batch.

By the use of this product it is possible to introduce in some instances all the silica and titanium in precombined form and in the form of a compound which in itself is a powerful flux. When the titanium oxide and silica are introduced separately, these oxides, which have a melting point of over 1520° C., have to be acted upon in the enamel smelting operation; on the other hand with our new compounds of sodium, silicon and titanium, we introduce these refractory elements in a form having fluxing properties resulting in a marked shortening of enamel smelting period, and also increasing the capacity of smelters due to relatively great density of the new compound as compared with the relatively great bulk of the charge when the titanium oxide and silica are added separately.

The use of our new compounds also eliminates the difficulties encountered when titanium oxide is used as such and when silica at usual fineness is used separately.

Alkaline agents other than sodium could be also used, such as alkaline earth materials, or alkaline earth could be combined and incorporated when preparing titanium silicates, but our preferred forms are the sodium titanium silicates as described in the preceding examples. The resulting dry roasted compound of Example A is in crystalline form, while the fused and water quenched product of Example B would be a glass and as such could be classed as amorphous.

Our preferred process and product is that of Example B involving the fusing of the charge to a glass, and the dry roasting of Example A could likewise be heated to form a clear glass, while the charge of Example B could be dry roasted as in Example A. In both examples the constituents and formulæ of the resulting products would be the same either with dry roasting or with fusion to form a clear glass.

The quantity of our improved vitreous enamel compositions to be introduced into the raw batch to form the enamel frit intended for use in the production of acid resisting vitreous enamel coatings may readily be ascertained by enamelers according to the operating conditions existing in the plant.

We claim as our invention:

1. The method of preparing a sodium titanium silicate composite which comprises heating a mixture of titanium oxide and silica with a less quantity of soda ash to substantial decomposition of said compounds at a temperature between 850° and 1200° C. until a fused glass is formed in which said compounds are chemically recombined.

2. The method of preparing a sodium titanium silicate composite for enamels which comprises heating a mixture of titanium oxide and silica with soda ash in the proportion of about 106 parts of soda ash to about 140 parts by weight of said titanium oxide and silica at a temperature between 850° and 1200° C. until a dry crystalline product is formed in which said compounds are chemically recombined, which product is fusible at enamel smelting temperatures.

3. The method of preparing a sodium titanium silicate composite for enamels which comprises heating a mixture of titanium oxide and silica with soda ash in the proportion of about 106 parts of soda ash to about 320 parts by weight of said titanium oxide and silica at a temperature between 850° and 1200° C. until a fused clear glass is formed in which said compounds are chemically recombined, which glass is fusible at enamel smelting temperatures.

4. A sodium titanium silicate composite having the qualities hereinbefore described and as consisting by analysis of sodium oxide (16 to 31%), titanium oxide (20 to 40%), and silica (29 to 63%), said compounds being chemically combined with each other.

5. A sodium titanium silicate composite for enamels having the qualities hereinbefore described and characterized as being a dry crystalline product and as consisting by analysis of sodium oxide about 31%, titanium oxide about 40% and silica about 29%, said compounds being chemically combined with each other, said product having approximately the formula ($NaTiSiO_5$) and being readily fusible at enamel smelting temperatures.

6. A sodium titanium silicate composite for enamels having the qualities hereinbefore described and characterized as being a fused clear glass and as consisting by analysis of sodium oxide about 16%, titanium oxide about 21% and silica about 63%, said compounds being chemically combined with each other, said glass having approximately the formula ($NaTiSi_4O_{11}$) and being readily fusible at enamel smelting temperatures.

7. A sodium titanium silicate composite such as may be obtained by heating a mixture of titanium oxide and silica with a substantially less quantity of soda ash to substantial decomposition of said compounds at a temperature between 850° and 1200° C., and characterized as being a clear glass in which said compounds are chemically recombined.

8. A sodium titanium silicate composite such as may be obtained by heating a mixture of titanium oxide and silica with a substantially less quantity of soda ash to substantial decomposition of said compounds at a temperature between 850° and 1200° C., and characterized as being a clear glass in which said compounds are chemically recombined, said glass being fluid at temperatures below 1000° C.

CHARLES J. KINZIE.
JOHN A. PLUNKETT.

CERTIFICATE OF CORRECTION.

Patent No. 1,925,560.  September 5, 1933.

CHARLES J. KINZIE, ET AL.

It is hereby certified that error appears in the printed specification of the above numbered patent requiring correction as follows: Page 3, first column, line 13, for "NaTiSiO$_5$" read --Na$_2$TiSiO$_5$--; and second column, line 76, for "NaTiSi$_4$O$_{11}$" read --Na$_2$TiSi$_4$O$_{11}$--; and that the said Letters Patent should be read with this correction therein that the same may conform to the record of the case in the Patent Office.

Signed and sealed this 22nd day of August, A. D. 1944.

Leslie Frazer

Acting Commissioner of Patents.

(Seal)